United States Patent
Salanta et al.

(10) Patent No.: US 8,375,709 B2
(45) Date of Patent: Feb. 19, 2013

(54) EXHAUST GAS ADDITIVE/TREATMENT SYSTEM AND MIXER FOR USE THEREIN

(75) Inventors: Gabriel Salanta, Ann Arbor, MI (US);
Daniel Salanta, Ann Arbor, MI (US);
Guanyu Zheng, Farmington, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 444 days.

(21) Appl. No.: 12/620,302

(22) Filed: Nov. 17, 2009

(65) Prior Publication Data

US 2011/0113764 A1    May 19, 2011

(51) Int. Cl.
*F01N 13/08* (2010.01)
(52) U.S. Cl. ................................. 60/324; 60/317
(58) Field of Classification Search ......... 60/288, 60/317, 324; 366/181.5, 337
See application file for complete search history.

(56) References Cited

U.S. PATENT DOCUMENTS

| | | | | |
|---|---|---|---|---|
| 4,034,965 A * | 7/1977 | King | ................. | 366/336 |
| 4,208,136 A * | 6/1980 | King | ................. | 366/338 |
| 4,220,416 A * | 9/1980 | Brauner et al. | ......... | 366/337 |
| 4,255,124 A | 3/1981 | Baranowski, Jr. | | |
| 4,259,021 A * | 3/1981 | Goudy, Jr. | .................... | 366/118 |
| 5,826,981 A * | 10/1998 | Fowler et al. | ............ | 366/337 |
| 6,237,221 B1 | 5/2001 | Mizobuchi | | |
| 7,028,663 B1 * | 4/2006 | Kim | ......................... | 123/306 |
| 7,490,467 B2 * | 2/2009 | Cummings | ................ | 60/324 |
| 2003/0165080 A1 * | 9/2003 | Pinyayev et al. | ......... | 366/337 |
| 2004/0223408 A1 * | 11/2004 | Mathys et al. | ............ | 366/337 |
| 2005/0219947 A1 * | 10/2005 | Carlson | ................. | 366/337 |
| 2006/0221763 A1 * | 10/2006 | Reis et al. | ................. | 366/149 |
| 2006/0245296 A1 * | 11/2006 | Nishioka et al. | ......... | 366/174.1 |
| 2008/0308083 A1 | 12/2008 | Wirth et al. | | |
| 2009/0235653 A1 * | 9/2009 | Mital et al. | ................. | 60/311 |
| 2009/0266064 A1 | 10/2009 | Zheng et al. | | |
| 2010/0071352 A1 * | 3/2010 | Tatur et al. | ................. | 60/287 |

OTHER PUBLICATIONS

International Search Report and Written Opinion dated Jan. 12, 2011.

* cited by examiner

*Primary Examiner* — Thomas Denion
*Assistant Examiner* — Jorge Leon, Jr.
(74) *Attorney, Agent, or Firm* — Wood, Phillips, Katz, Clark & Mortimer

(57) ABSTRACT

An exhaust mixer (16) is provided for use in an engine exhaust system (10) downstream from an additive injector (14). The mixer (16) includes eight vanes (20), with four of the vanes (20A) extending from a first side (22) of the mixer (16) and arranged in an equally spaced circumferential array around a central axis (24), and the other four of the vanes (20B) extending from an opposite side (26) of the mixer (16) and arranged opposite from the other four vanes (20A) in an equally spaced circumferential array. The vanes (20) include embossed ribs (60) and mount flanges (64).

14 Claims, 13 Drawing Sheets

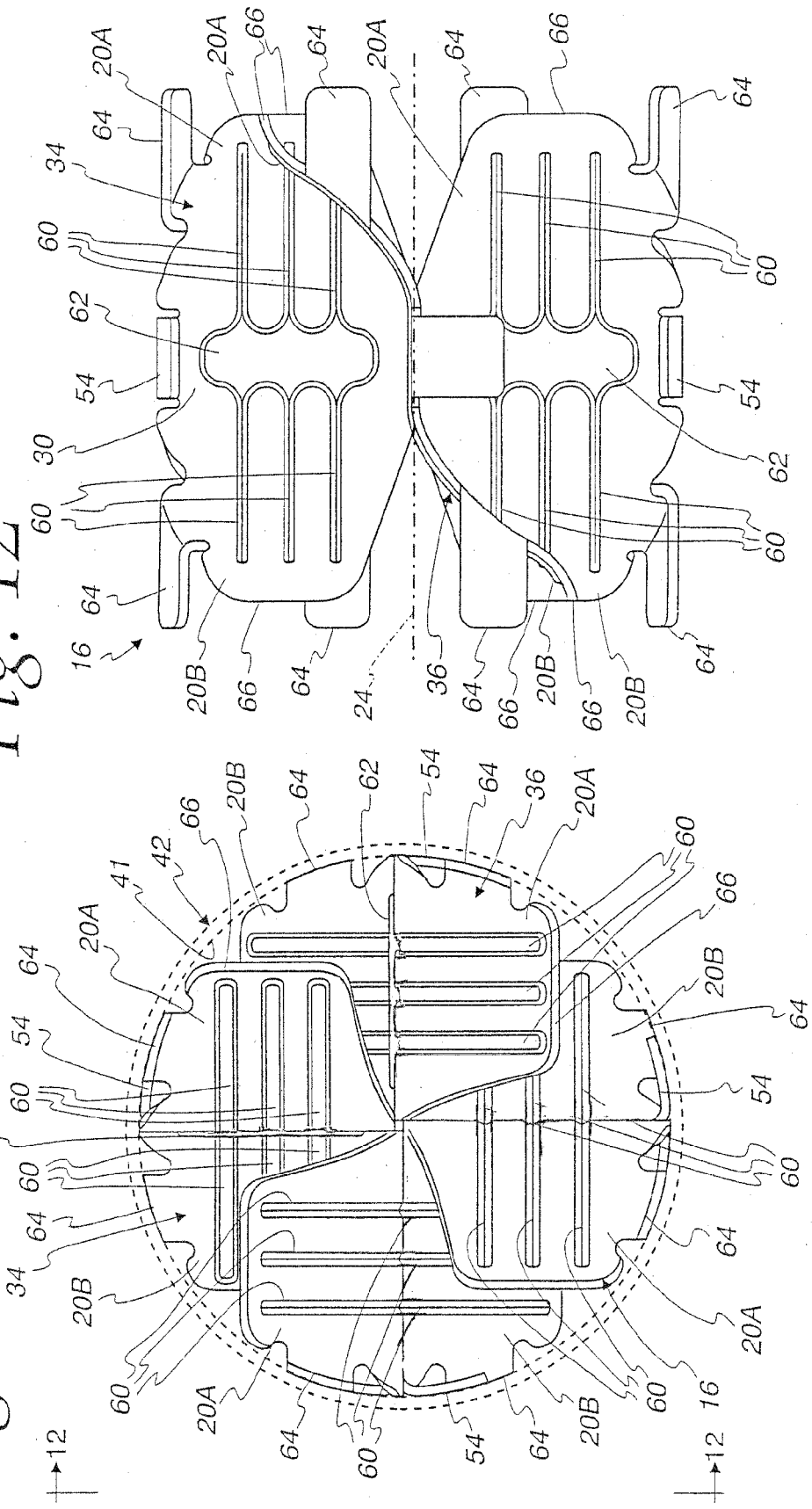

US 8,375,709 B2

EXHAUST GAS ADDITIVE/TREATMENT SYSTEM AND MIXER FOR USE THEREIN

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

BACKGROUND OF THE INVENTION

This invention relates to systems or devices that treat an exhaust gas or other gas stream by introducing one or more additives into the gas stream and for mixers used in such systems to mix the additive with the exhaust gas, often upstream of a catalyst.

It is known to treat exhaust gases or other gas streams by introducing one or more additives into the exhaust gas in order to enhance or create a catalytic reaction in a device downstream from the injection for the purpose of reducing undesirable emissions. In one known system, a reducing agent is injected into the exhaust gas of a diesel engine in order to reduce the amount of nitrogen oxides ($NO_x$) in the exhaust gas via catalytic reduction. In such systems, it is known for the additive to be provided in the form of ammonia or urea (dissolved in water) prior to the catalytic reaction. When this is done, it is important to obtain adequate mixing of the exhaust gas with the additive/reducing agent.

SUMMARY OF THE INVENTION

In accordance with one feature of the invention, an exhaust mixer is provided for use in an engine exhaust system downstream from an additive injector. The mixer includes a pair of interlocked blade structures, with each of the blade structures including a first pair of vanes extending from a first side of the blade structure and a second pair of vanes extending from an opposite side of the blade structure. At least one of the vanes including a mount flange extending from the vane for engaging with a support structure of the engine exhaust system.

As one feature, each of the vanes of each pair of vanes extends from the corresponding blade structure at a mixing angle that is congruent with the mixing angle of the other vane of the pair.

In one feature, the mixing angles of each pair of vanes are in opposite directions.

According to one feature, each of the blade structures is a unitary part that is interlocked with the other blade structure.

As one feature, the blade structures are identical to each other and are interlocked in opposite orientations.

According to one feature, each of the blade structures further includes a spine with the first and second pairs of vanes extending from the spine.

In one feature, each of the spines lies in a plane parallel to a central axis of the mixer.

As one feature, each of the spine includes a notch sized to receive the spine of the other blade.

According to one feature, at least one of the spines includes at least embossed rib extending along the spine.

As one feature, mount flanges extend from opposite ends of each of the spines.

In one feature, the blades are arranged normal to each other.

According to one feature, the vanes are all of the same size and shape.

As one feature, at least one the vanes includes at least one embossed rib extending along the vane.

In accordance with one feature of the invention, an exhaust mixer is provided for use in an engine exhaust system downstream from an additive injector. The mixer includes eight vanes, with four of the vanes extending from a first side of the mixer and arranged in an equally spaced circumferential array around a central axis, and the other four of the vanes extending from an opposite side of the mixer and arranged opposite from the other four vanes in an equally spaced circumferential array. At least one of the vanes includes a mount flange extending from the vane for engagement with a support structure of the engine exhaust system, and at least one of the vanes includes at least one embossed rib extending along the vane.

As one feature, each of the vanes extends from the mixer at a mixing angle that is congruent with the mixing angle of the other vanes.

According to one feature, the mixing angles of the vanes on the first side are in an opposite directions from the mixing angle of the vanes on the opposite side of the mixer.

In one feature, two of the vanes on the first side and two of the vanes on the second side extend from a spine.

As one feature, the spine lies in a plane parallel to a central axis of the mixer.

According to one feature, mount flanges extend from opposite ends of the spine.

According to one feature of the invention, an exhaust gas mixer is provided for use in an engine exhaust system downstream from an additive injector. The mixer includes a pair of interlocked blade structures, each of the blade structures including a first pair of vanes extending from a first side of the blade structure and a second pair of vanes extending from an opposite side of the blade structure. At least one of the vanes includes at least one embossed rib extending along the vane.

Other objects, features, and advantages of the invention will become apparent from a review of the entire specification, including the appended claims and drawings.

BRIEF DESCRIPTION OF THE DRAWINGS

FIG. 11 is a view similar to FIG. 2 but showing yet another alternate embodiment of a mixer according to the invention;

FIG. 12 is a side view of the component of FIG. 11 taken from line 12-12 in FIG. 11;

DETAILED DESCRIPTION OF THE PREFERRED EMBODIMENT

Figure 1:
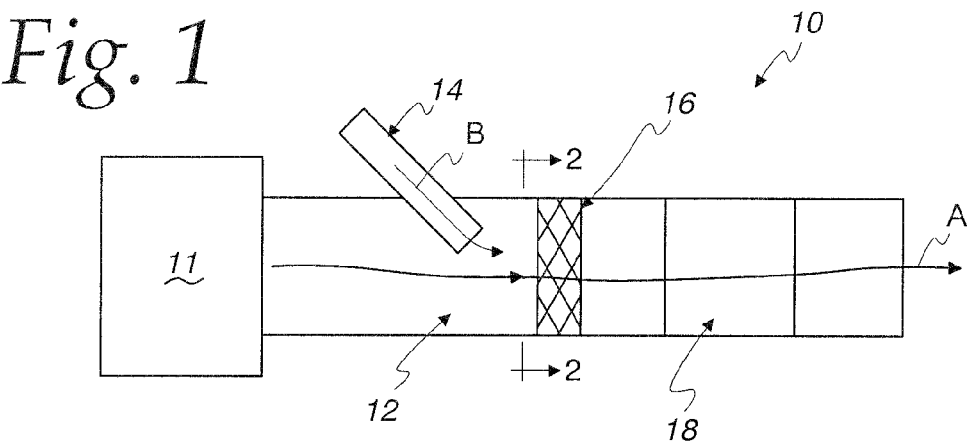
FIG. 1 is a diagrammatic representation of a system for treating an exhaust gas by introducing an additive into the exhaust gas upstream from a catalyst.
Figure 2:
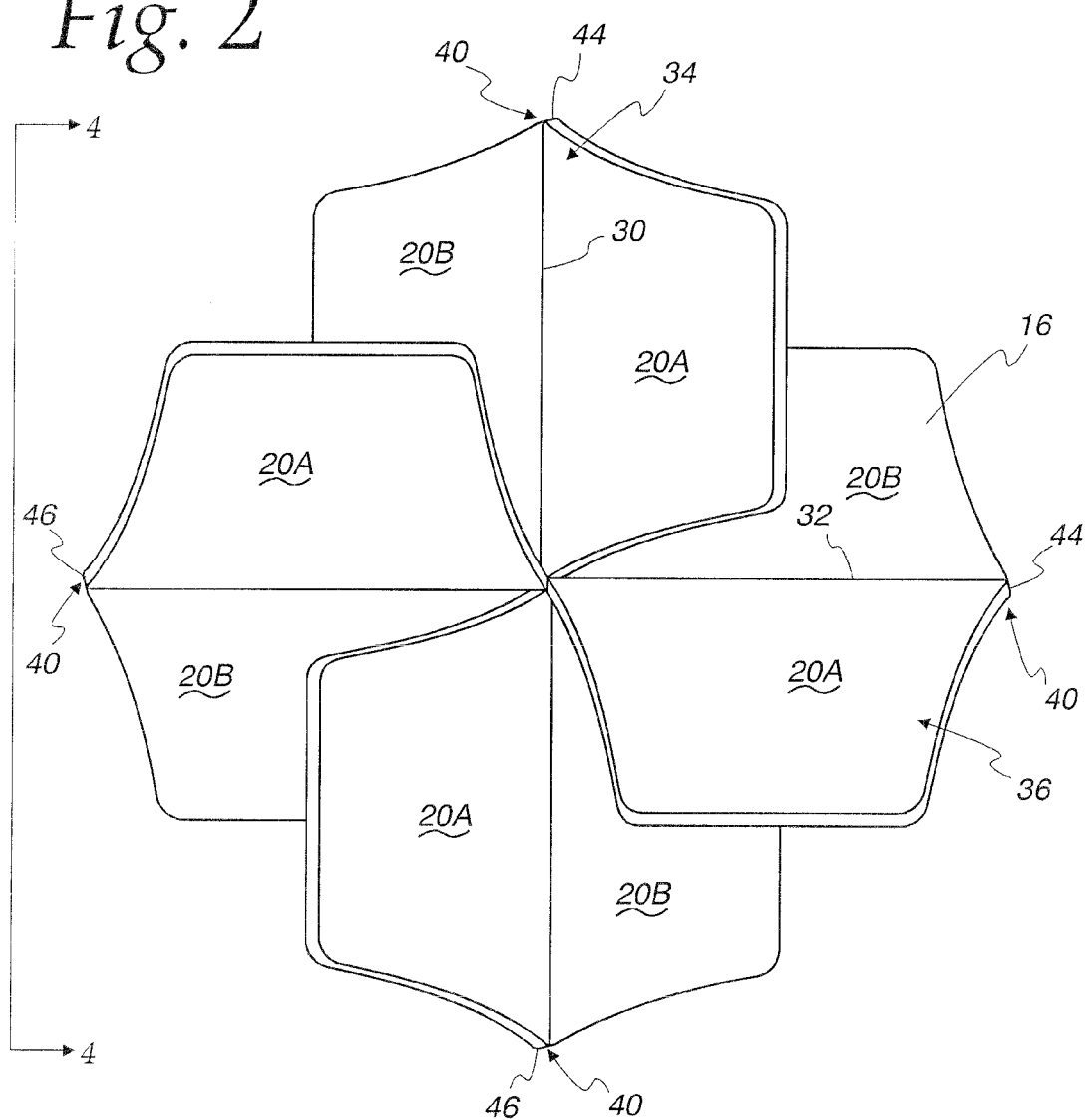
FIG. 2 is a view of an exhaust gas/additive mixer of FIG. 1 taken along lines 2-2 in FIG. 1.

With reference to FIG. 1, a system 10 is shown for treating an exhaust gas stream, shown schematically by arrow A, from an engine or other exhaust gas producing device 11. The system 10 includes a flow path 12, one or more additive injectors 14, a mixer 16, and an after treatment element or zone in the form of a selective catalytic reduction (SCR) catalyst 18. The flow path 12 may be provided in any suitable form, and typically will be provided in the form of an exhaust duct or pipe and/or a housing for the catalyst 18, and may be combined or integrated with other exhaust gas treatment structures, such as, for example, a muffler or particulate filter. The additive injector(s) 14 may also be of any suitable form, many which are known, and in the illustrated embodiment preferably injects a reagent solution (typically a urea solution), shown schematically by arrow B, into a diesel exhaust gas stream A upstream of the mixer 16 and the catalyst 18.

Figure 3:
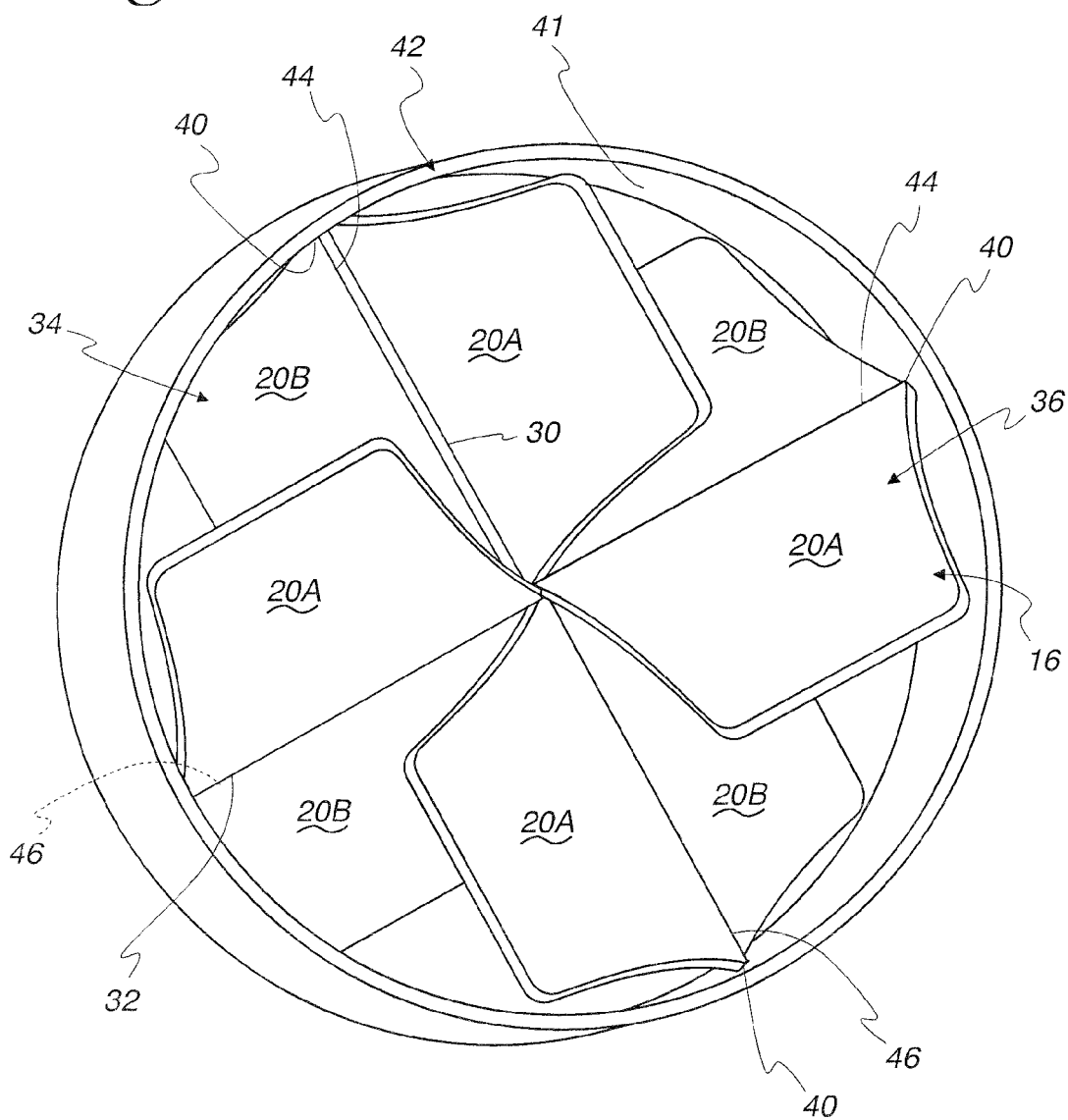
FIG. 3 is a perspective view of the mixer of FIG. 2 installed in a portion of an exhaust pipe of the system of FIG. 1.
Figure 4:
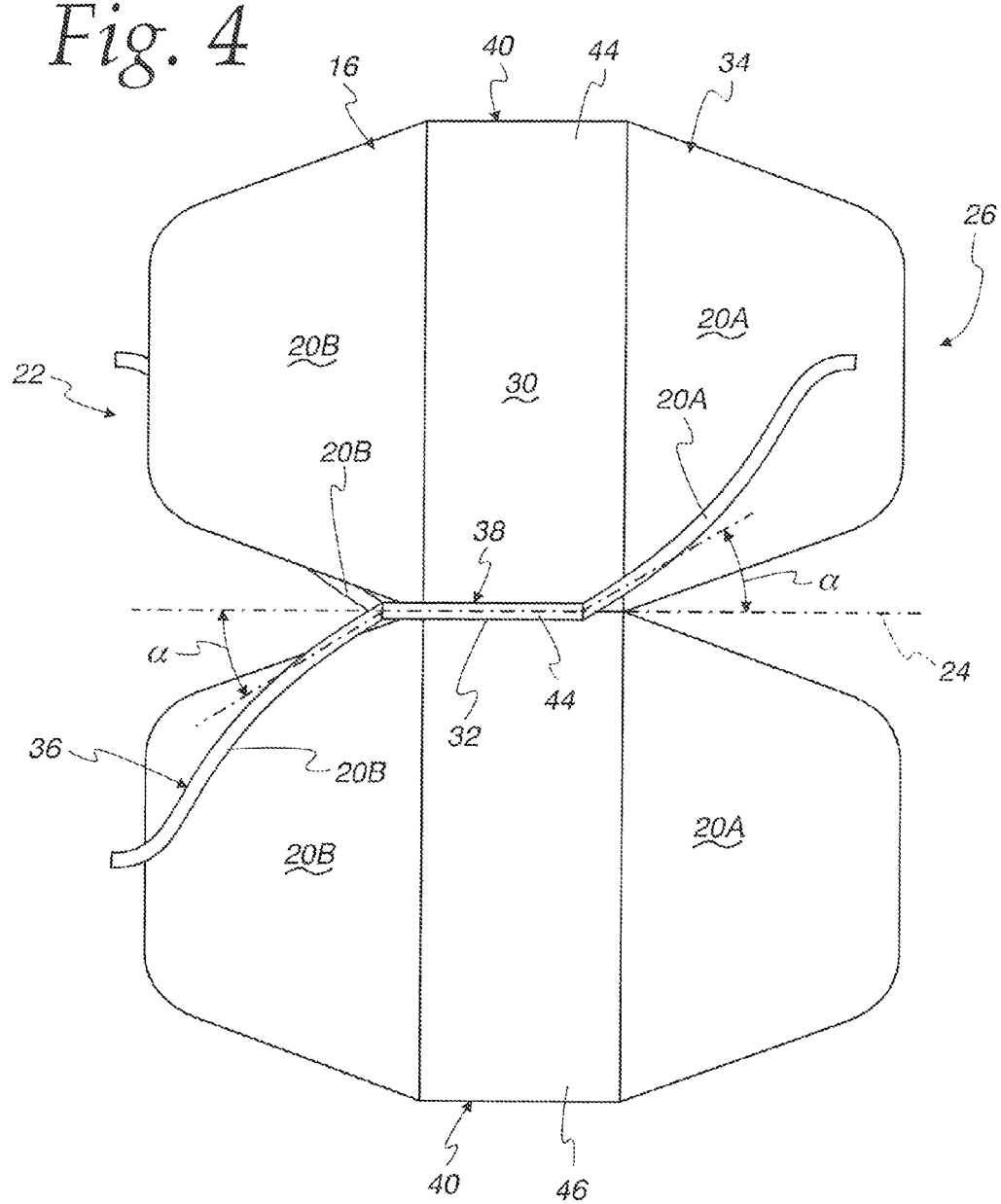
FIG. 4 is a side view of the component of FIG. 2 taken from line 4-4 in FIG. 2.

With reference to FIGS. 2-6, the mixer 16 includes eight vanes 20, with four of the vanes 20A extending from a first side 22 of the mixer 16 and arranged in an equally spaced circumferential array around a central axis 24, and the other four of the vanes 20B extending from an opposite side 26 of the mixer 16 and arranged opposite from the vanes 20A in an equally spaced circumferential array. As best seen in FIG. 4, preferably, each of the vanes 20 extends from the mixer 16 at a mixing angle α and curvature that is congruent with the mixing angle α and curvature of the other vanes 20, with the mixing angles α of the vanes 20A being in the opposite direction from the mixing angles α of the vanes 20B. It is also preferred that each of the vanes 20 be of the same size and shape as the other vanes 20.

Again with reference to FIG. 4, in the illustrated embodiment, two of the vanes 20A and the two vanes 20B arranged opposite therefrom extend from a central spine 30, with the other two of the vanes 20A and the other two of the vanes 20B arranged opposite therefrom extending from a central spine 32. Preferably, each of the spines 30 and 32 is planer and lies in a plane that is parallel to the axis 24.

Figure 5:
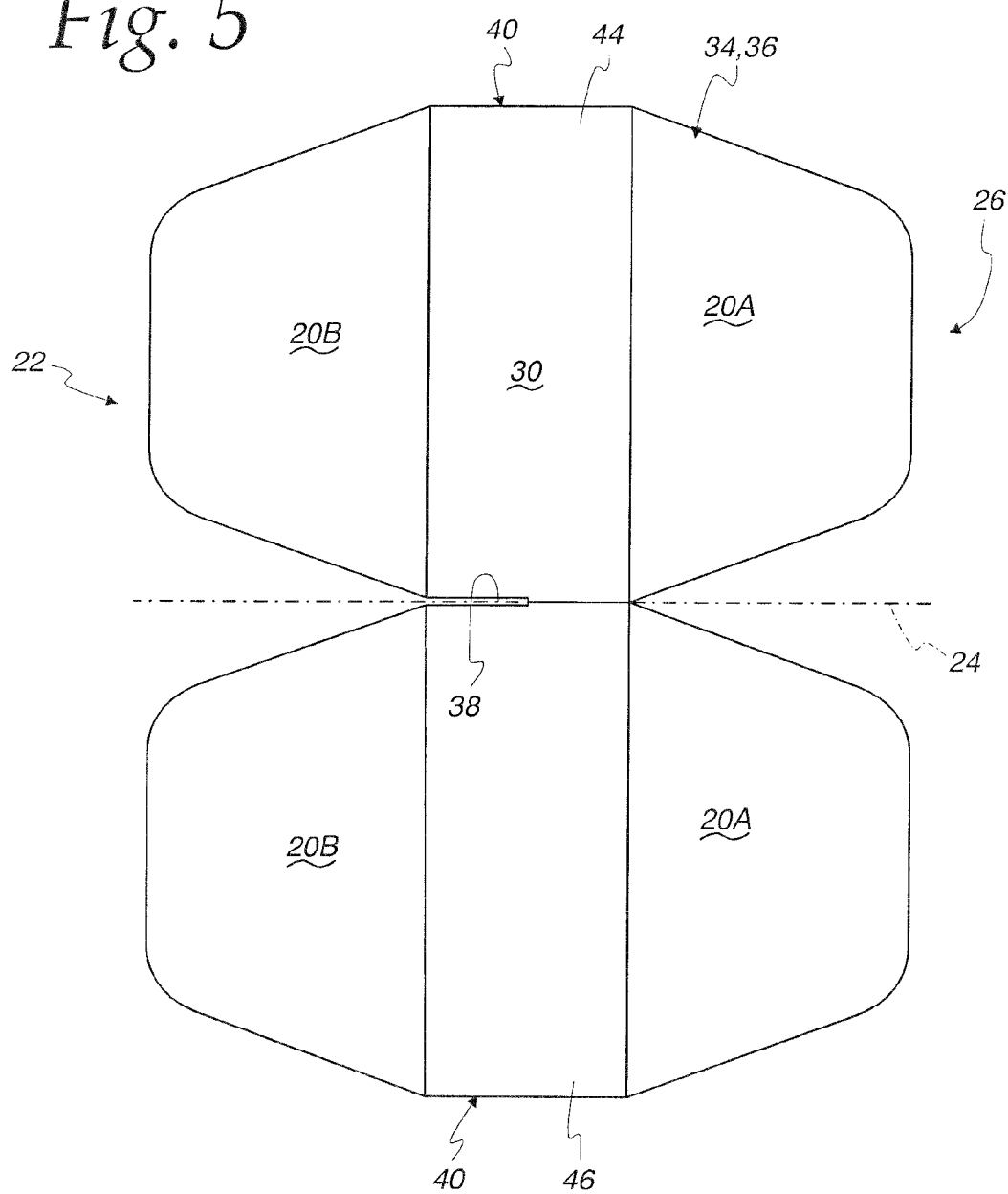
FIG. 5 is a view similar to FIG. 4, but with one component of the mixer removed.
Figure 6:
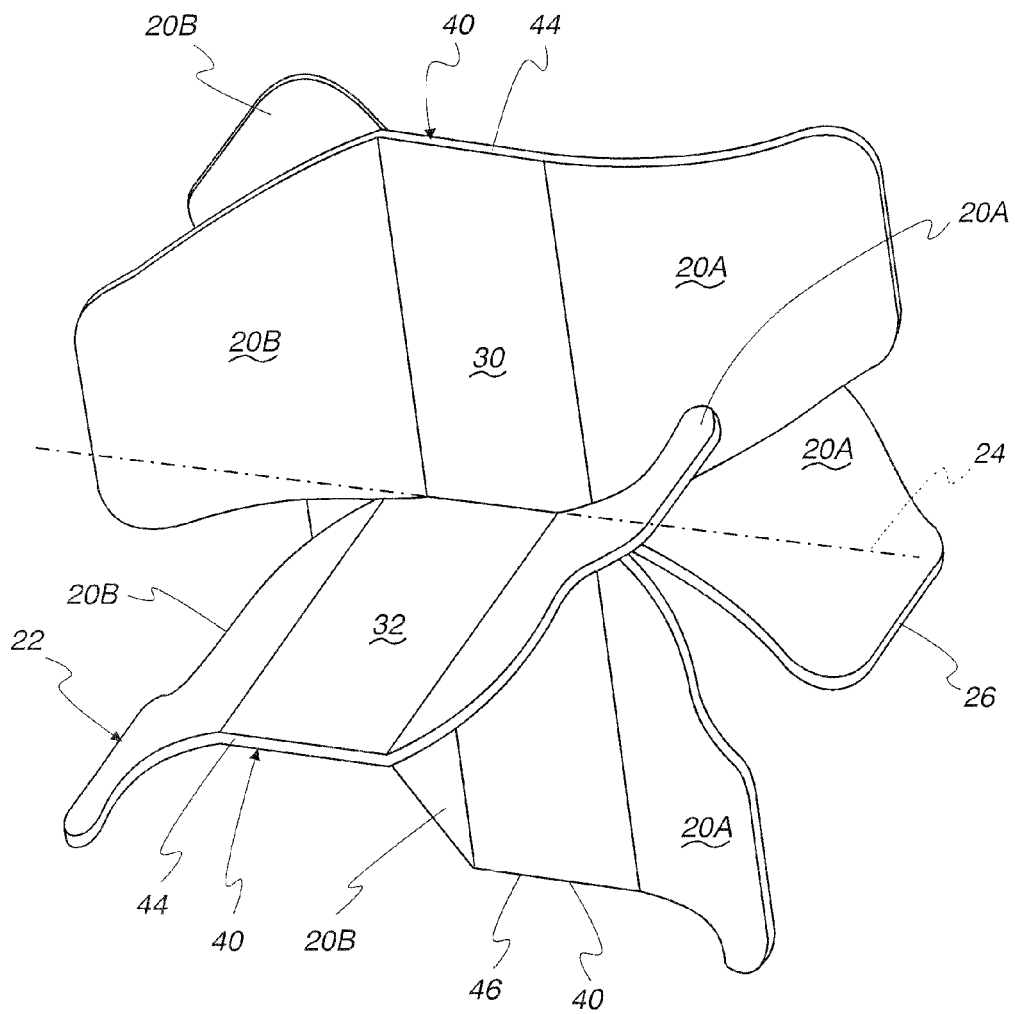
FIG. 6 is another perspective view of the mixer of FIG. 2.
Figure 7:
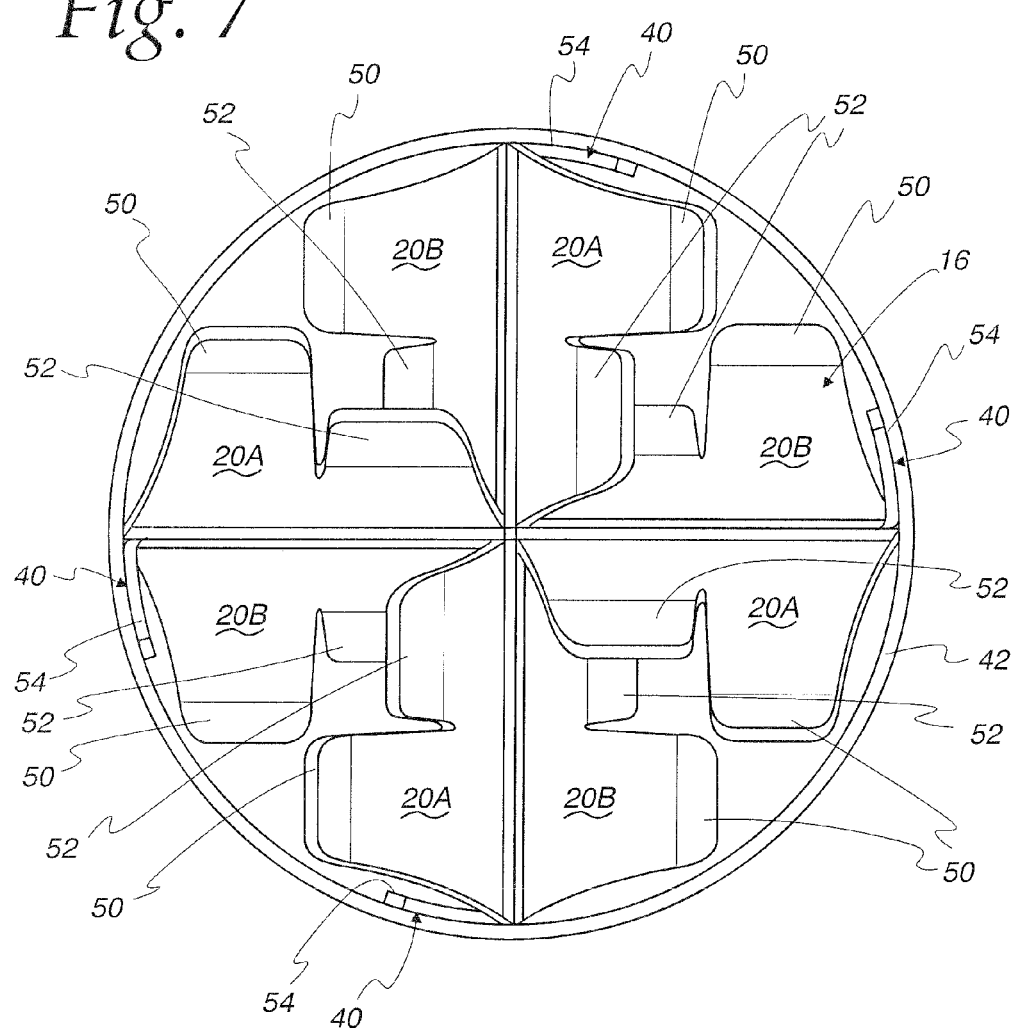
FIG. 7 is a view similar to FIG. 2 but showing an alternate embodiment of a mixer installed in a portion of an exhaust pipe of the system of FIG. 1.
Figure 8:
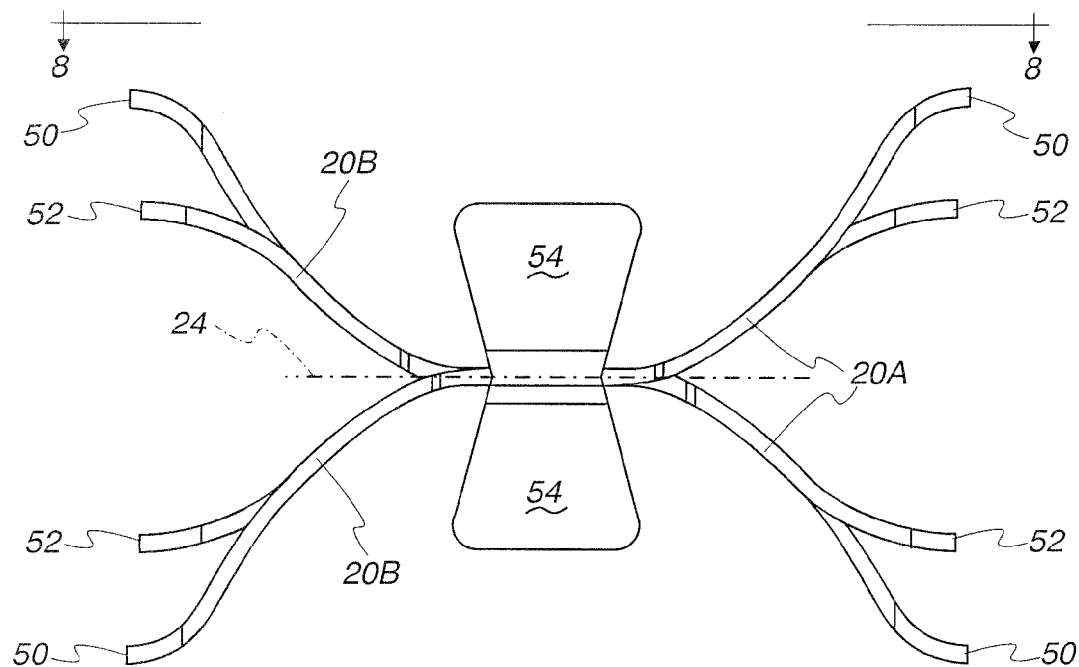
FIG. 8 is a top view of the mixer component of FIG. 7, but with one component of the mixer removed.

While any suitable construction can be used, as best seen in FIG. 5, the mixer 16 is preferably constructed from a pair of interlocked blade structures 34 and 36 (only one shown in FIG. 5), with each of the blade structures including either the vanes 20A and 20B that extend from the spine 30, or the vanes 20A and 20B that extend from the spine 32. In this regard, each of the spines 30 and 32 includes a slot or notch 38 that is sized to receive the spine 30, 32 of the other blade 34, 36. It can be seen that with the preferred embodiments described to this point, the blades 34 and 36 are identical to each other and can be defined as a single piece part. In this regard, while the blades 34 and 36 can be manufactured by any suitable means, it is preferred that the blades 34 and 36 be fabricated from a stamped piece of sheet metal that is suitable for the temperature, stresses, gases, and other parameters of each application.

The advantages of having a single piece part and the ability for that part to be manufactured as a stamping will be evident to those skilled in the art.

With reference to FIG. 3, it can be seen that the mixer 16 is preferably sized so that its radially outermost surfaces 40 engage an inner surface 41 of the exhaust housing or pipe 42 in which the mixer 16 is mounted. As best seen in FIGS. 4 and 5, the surfaces 40 are defined by the opposite ends 44 and 46 of each of the spines 30 and 32. Preferably, the surfaces 40 are bonded to the inner surface 41 such as by brazing or welding. Depending upon which direction the sides 22 and 26 are facing when the mixer 16 is mounted in the exhaust housing or pipe 42, either the vanes 20A or the vanes 20B will be on an upstream side of the mixer 16 with respect to the direction of exhaust gas flow and the other of the vanes 20A and 20B will be on the downstream side of the mixer 16 with respect to the direction of the exhaust gas flow.

With reference to the alternate embodiment of the mixer 16 shown in FIGS. 7-10, it can be seen that the end of each of the vanes 20 has been bifurcated to define at least two end baffles 50 and 52, with each of the end baffles 50 and 52 preferably having an orientation relative to the mixer that is different from the orientation of the other of the baffles 38 and 40 for each vane 20A and 20B. Specifically, each of the baffles 50 has a mixing angle and/or curvature that is/are different from the mixing angle and/or curvature of the baffles 52. As with the embodiment of FIGS. 2-6, it is preferred that the mixing angle α and curvature of each of the vanes 20 be congruent to the mixing angle α and curvature of the other vanes 20, and that the vanes 20 all have the same size and shape.

Figure 9:
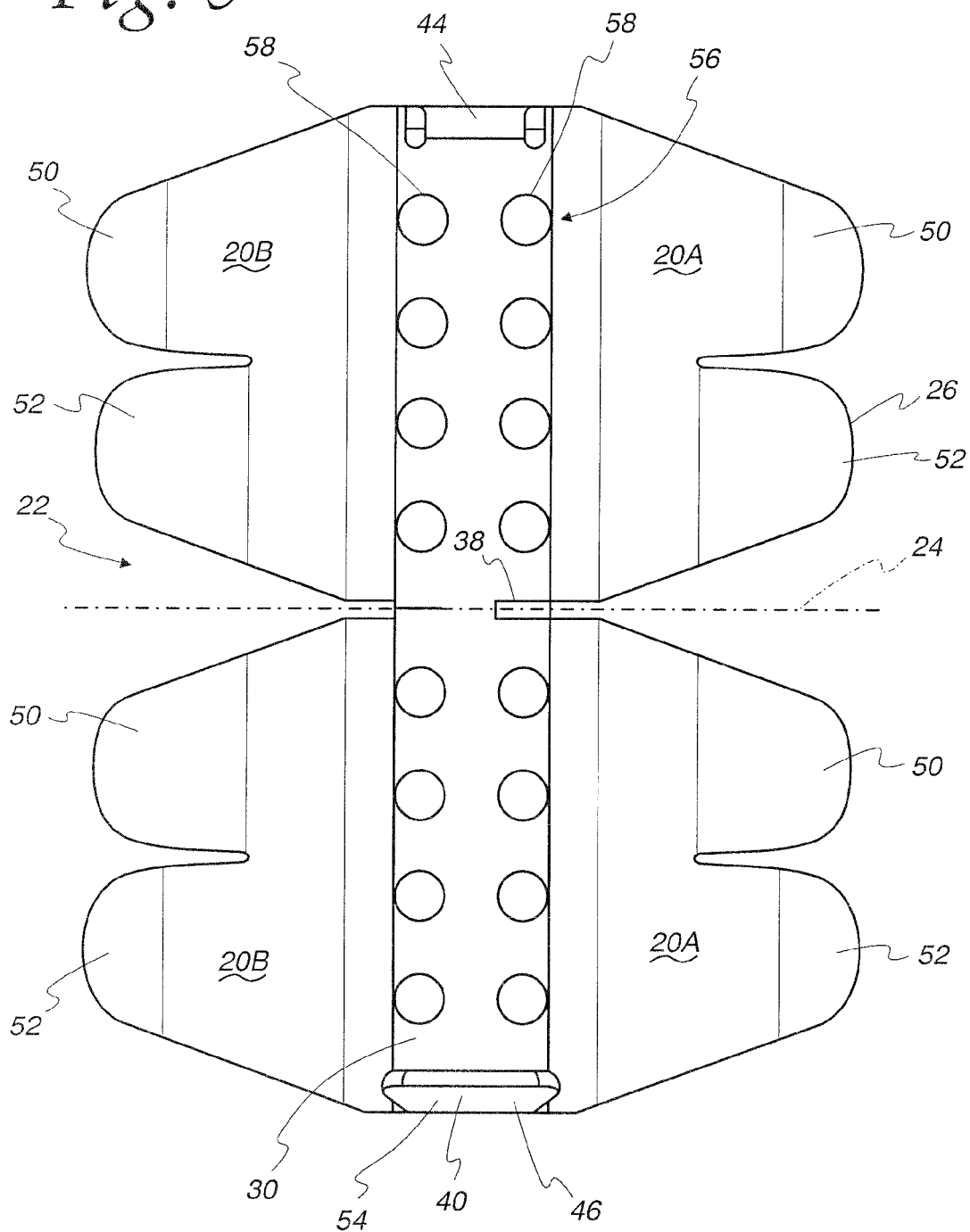
FIG. 9 is a view taken from line 8-8 in FIG. 8.
Figure 10:
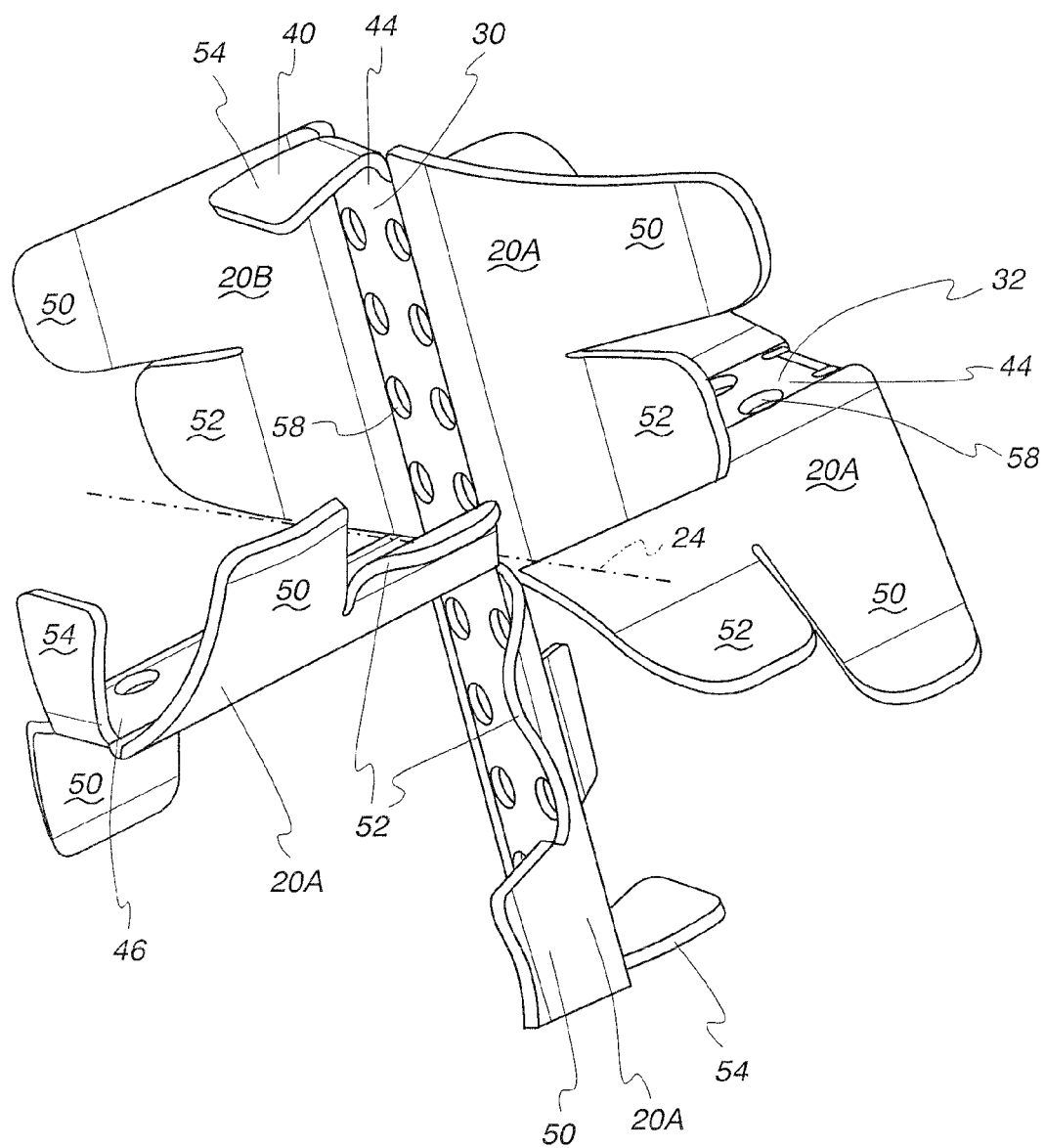
FIG. 10 is a perspective view of the mixer of FIG. 7.
Figure 13:
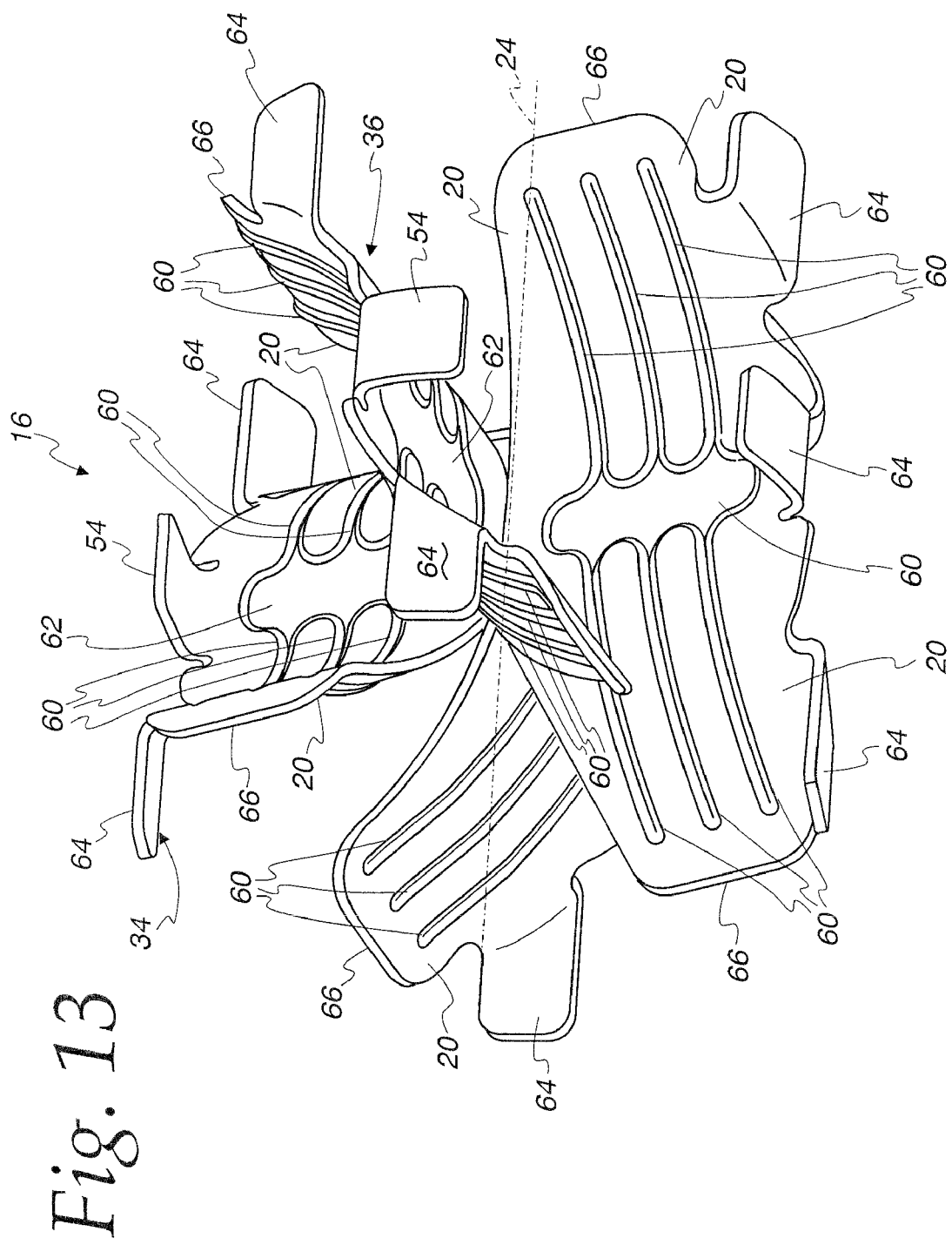
FIG. 13 is a perspective view of the mixer of FIGS. 11 and 12.
Figure 14:
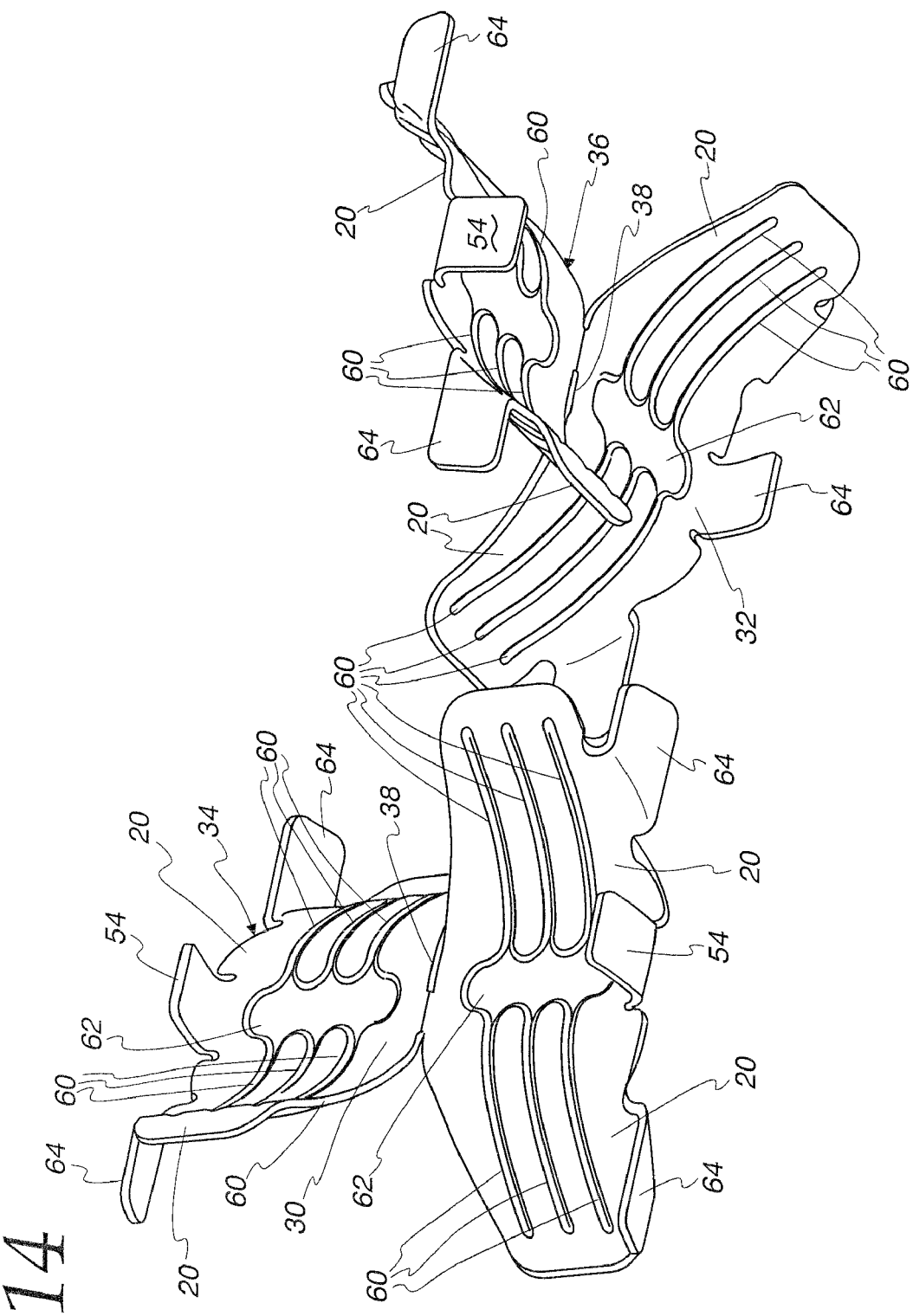
FIG. 14 is an exploded perspective view of the mixer of FIGS. 11-13.
Figure 15:
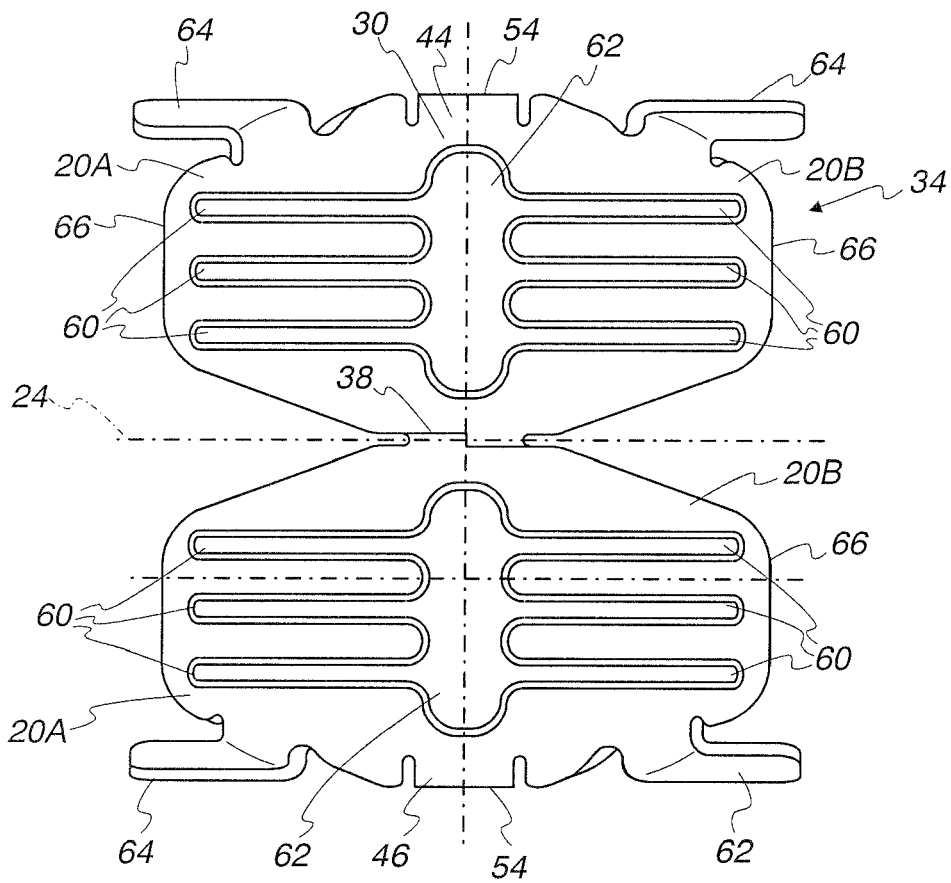
FIG. 15 is a side view similar to FIG. 12, but taken from the opposite side and showing only one of the components of the mixer of FIGS. 11-14.
Figure 16:
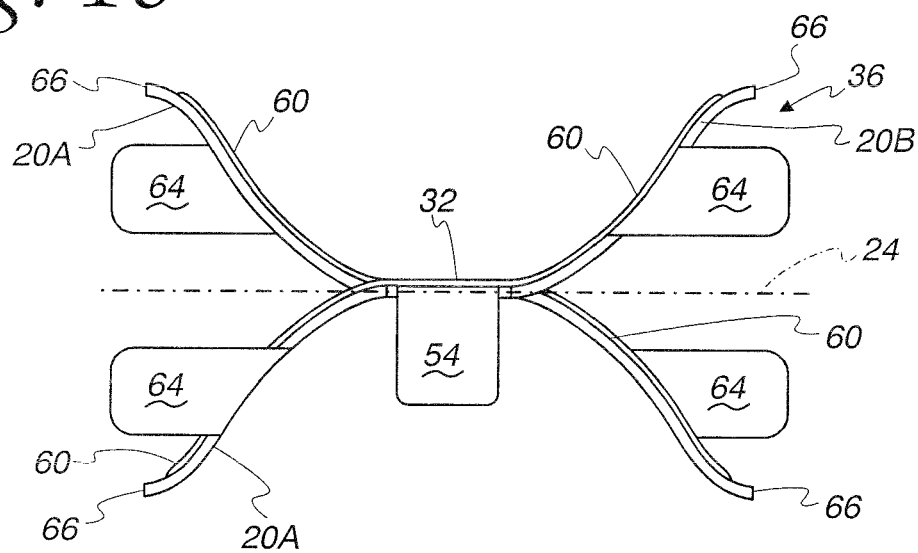
FIG. 16 is a side view similar to FIG. 15, but showing the other component of the mixer.

As another feature, it can be seen that the radially outermost surfaces 40 of the embodiment of FIGS. 7-10 are defined by circumferentially extending mount flanges 54 that extend from the ends 44 and 46 of each of the spines 30 and 32. Preferably, the flanges 54 are bonded to the inner surface 41 of the exhaust housing or pipe 42 such as by brazing or welding. As yet another feature, each of the spines 30 and 32 is perforated with an array 56 of circular openings 58 (16 in the illustrated embodiment), as best seen in FIGS. 9 and 10, which are intended to enhance mixing of the additive(s) and the exhaust gas.

With reference to the alternate embodiment of the mixer 16 shown in FIGS. 11-16, it can be seen that this embodiment is similar to the embodiment of FIGS. 2-6 in that the end of each of the vanes 20 is not bifurcated, and is similar to the embodiment of the mixer 16 shown in FIGS. 7-10 in that it includes the mount flanges 54 that extend from the ends 44 and 46 of each of the spines 30 and 32. The embodiment of FIGS. 11-16 adds the additional features of three (3) embossed ribs 60 in each of the vanes 20, an embossed rib 62 in each of the spines 30 and 32, and mount flanges 64 provided on each of the vanes 20 for bonding to the inner surface 41 of the exhaust housing or pipe 42, such as by brazing or welding. In the illustrated embodiment, the embossed ribs 60 are linear and extend in planes that are parallel to the axis 24, and the embossed ribs 62 are linear and extend transverse to the axis 24. Furthermore, in the illustrated embodiment, the ribs 60 and 62 are interconnected to each other. Each of the mount flanges 64 extends from a generally central portion of an outer peripheral edge of each of the vanes 20 for contact with the inner surface 41 of the exhaust housing or pipe 42. It is believed that the ribs 60 and 62 enhance both the structural integrity of the mixer 16 and the mixing of the mixer 16, and that the mount flanges 64 further enhance the structural integrity of the mixer 16 when mounted in the exhaust housing or pipe 42.

It should be understood that while preferred embodiments of the ribs 60 and 62 are shown, other embodiments are possible. For example, it may be desirable in some applications for the ribs 60 to not extend in planes that are parallel to the central axis 24 of the mixer 16, and/or not to extend parallel to each other. In this regard, in some applications it may be advantageous for the ribs 60 to extend at angles that would potentially enhance the mixing by adding swirl to the fluid flows passing over the vanes 20. By way of further example, in some applications it may be desirable for the ribs 60 to extend to either or both of the leading and trailing edges 66 of each of the vanes 20, or selected ones of the vanes 20. As yet a further example, it may be desirable in some applications for more than three ribs 60 to be provided on each of the vanes 20, or less than three ribs 60 to be provided on each of the vanes 20 on some of the vanes 20. As yet another example, it may be desirable in some applications for the ribs 62 not to be included on the spines 30 and 32. As one more example, it may be desirable in some applications for the ribs 62 not to be interconnected with the ribs 60.

Similarly, it should be understood that while a preferred form is shown for the mount flanges 54 and 64, in some applications, it may be desirable for other shapes and/or configurations to be utilized for the flanges 54 and 64. For example, while the flanges 64 are shown extending from a central portion of each of the vanes 20, in some applications it may be desirable for the flanges 64 to extend from a location close to the leading and trailing edges 66 of the vanes 20, or for the flanges 64 to extend from the vanes 20 closely adjacent the spines 30 and 32.

It should also be appreciated that the ribs 60, the ribs 62, or the mount flanges 64 can be incorporated with any of the embodiments shown in FIGS. 1-10, with any of the above-discussed modifications.

For all of the illustrated embodiments, testing has shown that the vanes 20A and 20B swirl the combined gas/additive flow to provide enhanced mixing and superior reduction efficiency from the system 10 in comparison to more conventional mixers.

It should be understood that while preferred embodiments of the mixer 16 have been shown herein, there are many possible modifications that may be desirable depending upon the particular brand of each application. For example, while the vanes 20A and 20B are all of the same size and shape in each of the mixer embodiments 16 shown in FIGS. 3-16, in some applications it may be desirable for selected ones, or all of the vanes 20 to be of a different size and shape with respect to other vanes 20 in the mixer 16. Similarly, while the baffles 50 and 52 on each of the vanes 20 in the embodiment of FIGS. 7-10 are of a different size and shape relative to each other, in some applications, it may be desirable for the baffles 50 and 52 to be of the same size and shape. Furthermore, while the mixing angles α and curvature are congruent for all of the vanes 20 in the illustrated embodiments, in some applications it may be desirable for the mixing angles α and/or curvature to vary for one or more of the vanes 20 in comparison to the mixing angle α and/or curvature of the other vanes 20. As yet another example, while the spines 30 and 32 of the embodiment of FIGS. 2-6 and FIGS. 11-16 are shown as imperforate, it may be desirable in some applications for the spines 30 and 32 to include the openings 58. In this regard, while the openings 58 are shown as circular and are arranged in a specific array, other shapes, sizes, numbers and arrays may be desirable depending upon the specific parameters of each application. By way of further example, while each vane 20 has been shown in FIGS. 7-10 with two baffles 50 and 52, it may be desirable in some applications for each of the vanes 20 to include more than two baffles. Furthermore, while the baffles 50 have been illustrated as having a different mixing angle and curvature from the baffles 52, it may be desirable for the mixing angles and/or curvatures of the baffles 50 and 52 to be congruent.

The invention claimed is:

1. An exhaust mixer for use in an engine exhaust system downstream from an additive injector, the mixer comprising:
   a pair of interlocked blade structures, each of the blade structures comprising
      a longitudinally extending spine having a width between opposite first and second sides, the spine having longitudinal ends for engagement with a support structure of the engine exhaust system,
      a first, pair of vanes extending from the first side of the blade structure spine, and
      a second pair of vanes extending from the opposite second side of the blade structure,
      a slot between the first pair of vanes extending from the first side of the blade structure spine toward the opposite second side of the blade structure spine;
   wherein said pair of blade structures are interlocked with the spine of one of said blade structures received in the slot in the other of said blade structures and the spine of the other of said blade structures received in the slot of said one of said blade structures.

2. The exhaust mixer of claim 1 wherein each of the vanes of each pair of vanes extends from the spine at a mixing angle that is congruent with the mixing angle of the other vane of the pair and the mixing angles of each pair of vanes are in opposite directions.

3. The exhaust mixer of claim 1 wherein each of the blade structures is a unitary part.

4. The exhaust mixer of claim 1 wherein the blade structures are identical to each other and are interlocked in opposite orientations.

5. The exhaust mixer of claim 1 wherein each of the spines lies in a plane parallel to a central axis of the mixer.

6. The exhaust mixer of claim 1 wherein at least one of the spines includes at least one embossed rib extending along the spine.

7. The exhaust mixer of claim 1 wherein mount flanges extend from opposite ends of each of the spines.

8. The exhaust mixer of claim 1 wherein the blades are arranged normal to each other.

9. The exhaust mixer of claim 1 wherein the vanes are all of the same size and shape.

10. The exhaust mixer of claim 1 wherein at least one of the vanes includes at least one embossed rib extending along the vane.

11. The exhaust mixer of claim 1, further comprising a mount flange extending laterally from a longitudinal end of at least one of said spines for engagement with a support structure of the engine exhaust system.

12. An exhaust mixer for use in an engine exhaust system downstream from an additive injector, the mixer comprising:
   a pair of interlocked blade structures, each of the blade structures comprising
      a longitudinally extending spine having a width between opposite first and second sides,
      a slot in the spine midway between longitudinal ends of the spine extending from the first side of the blade structure spine toward the opposite second side of the blade structure spine,
      a first pair of vanes on opposite longitudinal ends of said spine extending from the first side of the blade structure spine, and a second pair of vanes on opposite longitudinal ends of said spine extending from the opposite second side of the blade spine, each of the vanes of each pair of vanes extending from the spine at a mixing angle that is congruent with, and in the opposite direction of, the mixing angle of the other vane of the pair, longitudinally spaced baffles on the end of each vane remote from said spine, said baffles of each vane having a different orientation than the orientation of the other baffle of that vane, and a mount flange extending laterally from a longitudinal end of at least one of said spines for engagement with a support structure of the engine exhaust system, wherein said pair of blade structures are interlocked with the spine of one of said blade structures received in the slot in the other of said blade structures and the spine of the other of said blade structures received in the slot of said one of said blade structures.

13. The exhaust mixer of claim 12 wherein the spine lies in a plane parallel to a central axis of the mixer.

14. The exhaust mixer of claim 12 wherein mount flanges extend from opposite ends of the spine.

* * * * *